US011036326B2

(12) United States Patent
Autio et al.

(10) Patent No.: US 11,036,326 B2
(45) Date of Patent: Jun. 15, 2021

(54) HAPTIC INTERACTION VIA MAGNETIC FORCE

(71) Applicant: Microsoft Technology Licensing, LLC, Redmond, WA (US)

(72) Inventors: Henri A. Autio, Redmond, WA (US); Kenneth Mikael Majander, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 16/459,891

(22) Filed: Jul. 2, 2019

(65) Prior Publication Data
US 2021/0004113 A1   Jan. 7, 2021

(51) Int. Cl.
*G06F 3/041* (2006.01)
*G06F 3/01* (2006.01)
*G06F 3/0354* (2013.01)
*G06F 3/048* (2013.01)

(52) U.S. Cl.
CPC ............ *G06F 3/0414* (2013.01); *G06F 3/016* (2013.01); *G06F 3/03545* (2013.01); *G06F 3/048* (2013.01); *G06F 3/0416* (2013.01)

(58) Field of Classification Search
CPC ........ G06F 3/016; G06F 3/048; G06F 3/0414; G06F 3/0416; G06F 3/03545; G06F 3/0446; G06F 3/046
See application file for complete search history.

(56) References Cited

U.S. PATENT DOCUMENTS

| 8,416,066 | B2 | 4/2013 | Westerinen et al. |
| 9,389,707 | B2 * | 7/2016 | Yilmaz ................. G06F 3/0441 |
| 9,690,431 | B2 * | 6/2017 | Shahparnia ......... G06F 3/03545 |
| 9,727,161 | B2 * | 8/2017 | Hinckley .............. G06F 3/0416 |
| 9,870,083 | B2 * | 1/2018 | Hinckley ............ G06F 3/03545 |
| 10,437,359 | B1 * | 10/2019 | Wang .................... G06F 1/1643 |

(Continued)

FOREIGN PATENT DOCUMENTS

| EP | 2706440 A2 | 3/2014 |
| EP | 2738646 A1 | 6/2014 |

(Continued)

OTHER PUBLICATIONS

Garun, Natt, "Tanvas' haptic feedback system lets you feel texture on a touchscreen", Retrieved From: https://www.theverge.com/ces/2017/1/5/14185134/tanvas-touchscreen-haptic-feedback-ces-2017, Jan. 5, 2017, 2 Pages.

(Continued)

*Primary Examiner* — Vijay Shankar
(74) *Attorney, Agent, or Firm* — Alleman Hall Creasman & Tuttle LLP

(57) ABSTRACT

A touch-screen device, a touch-screen stylus, and a method to provide haptic feedback to a user of a touch-screen device. The method comprises steps of recognizing the relative position of the tip of a touch-screen stylus relative to a sensory surface of the touch-screen device; asserting a haptic-force signal that varies in response to the relative position; and passing a controlled, variable electric current through an electromagnetic circuit to exert a magnetic force between the touch-screen device and the touch-screen stylus, wherein the electric current is varied in dependence on the haptic-force signal.

18 Claims, 7 Drawing Sheets

(56) References Cited

U.S. PATENT DOCUMENTS

2013/0307829 A1 11/2013 Libin
2015/0241970 A1 8/2015 Park et al.
2016/0378209 A1 12/2016 Wong et al.

FOREIGN PATENT DOCUMENTS

WO 2007049253 A2 5/2007
WO 2018197052 A1 11/2018

OTHER PUBLICATIONS

"International Search Report and Written Opinion Issued in PCT Application No. PCT/US20/033332", dated Aug. 25, 2020, 11 Pages.

* cited by examiner

HAPTIC INTERACTION VIA MAGNETIC FORCE

BACKGROUND

A touch screen is a state-of-the-art user-interface (UI) component common to various types of electronic devices. A touch screen may employ resistive, capacitive, or optical touch sensing, for example, to reliably track touch from one or more fingers of a user or from a touch-screen stylus held in the user's hand. To provide a more immersive experience, a touch-screen display device or stylus may provide visual or audible feedback to the user as the touch point moves over a sensory surface of the device.

SUMMARY

One aspect of this disclosure relates to a touch-screen device comprising a position sensor, an electromagnetic circuit, and a drive circuit. The position sensor is configured to sense the relative position of a magnetically attractable tip of a touch-screen stylus relative to a sensory surface of the touch-screen device. The electromagnetic circuit carries an electric current and forms, in proportion to the electric current, a magnetic force to attract the magnetized tip to the sensory surface. The drive circuit is configured to receive a haptic-force signal and to vary the magnetic force by varying the electric current in dependence on the haptic force signal, which, in turn, is varied in dependence on the relative position.

Another aspect of this disclosure relates to a touch-screen stylus for a magnetically attractable touch-screen device. The touch-screen stylus comprises an electromagnetic circuit and a drive circuit. Arranged at the tip of the touch-screen stylus, the electromagnetic circuit carries an electric current and forms, in proportion to the electric current, a magnetic force to attract the touch-screen device to the tip. The drive circuit is configured to receive a haptic-force signal and to vary the magnetic force by varying the electric current in dependence on the haptic-force signal, which, in turn, is varied in dependence on the relative position of the tip of the touch-screen stylus relative to a sensory surface of the touch-screen device.

Another aspect of this disclosure relates to a method to provide haptic feedback to a user of a touch-screen device. The method comprises steps of recognizing the relative position of the tip of a touch-screen stylus relative to a sensory surface of the touch-screen device; asserting a haptic-force signal that varies in response to the relative position; and passing a controlled, variable electric current through an electromagnetic circuit to exert a magnetic force between the touch-screen device and the touch-screen stylus, wherein the electric current is varied in dependence on the haptic-force signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
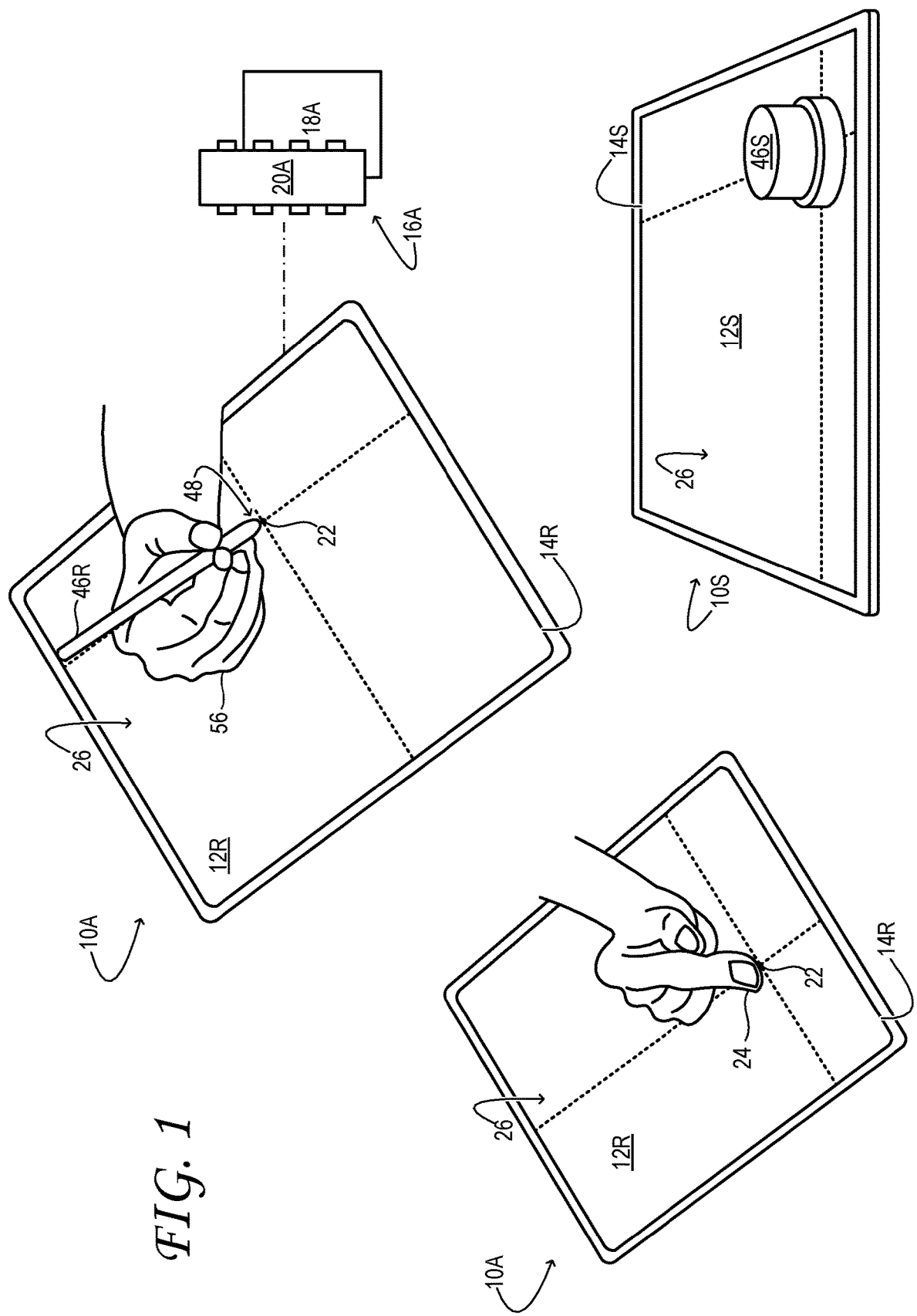
FIG. 1 shows aspects of example touch-screen devices.

Although a touch-screen device or stylus may provide visual or audible feedback to the user as the touch point moves over the sensory surface of the device, an even more immersive experience may be provided in systems configured for haptic feedback. In particular, haptic feedback may be used to provide a sensation coordinated to any changing variable, including movement of the user's touch point over the sensory surface. Some implementations of that idea employ a touch-screen stylus configured to vibrate in dependence on the position of the touch point relative to the sensory surface. A figure of merit for any device offering haptic feedback is the degree to which the experience of the user operating the device resembles an analogous real-world experience. However, position-dependent vibration of a touch-screen stylus in the user's hand poorly resembles the feeling of moving a real-world object over a real-world terrain. For instance, some portions of a real-world terrain (e.g., a frozen pond) may offer very little resistance to movement of the object, whereas other portions (e.g., sand, a hill, or a fence) may offer increased resistance. On its face, causing a touch-screen stylus to vibrate in dependence on the touch-point position cannot convincingly simulate variable resistance to motion.

In contrast, the touch-screen systems described herein are configured to vary a magnetic force applied between the sensory surface of a touch-screen and a touch-screen stylus held in the user's hand. In scenarios in which the tip of the touch-screen stylus is in physical contact with the sensory surface, the varying magnetic force imparts a varying frictional force between the tip and the surface, which not only simulates but actually causes variable resistance to motion. Operationally, the systems described herein may be used to model a heterogeneous terrain on the sensory surface of the touch screen, which the user may navigate via the touch-screen stylus. The terrain may include some regions of facile movement of the tip over the sensory surface, and other regions where movement is more difficult or restricted. The ease of movement of the touch-screen stylus over any area of the touch-screen surface may additionally or alternatively be varied as a function of time or any other suitable parameter. These and other features are described in greater detail hereinafter.

This disclosure will now be presented by way of example and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of an example touch-screen device 10A that includes a touch screen 12R. Touch-screen device 10A is one part of a touch-screen system that may also include a touch-screen stylus (vide infra). In the illustrated example, the touch-screen device is a tablet computer system: it includes a display 14R and an integrated computer system 16A. In other examples, the touch-screen device may take the form of a smartphone, laptop computer system, all-in-one computer system, or computer system monitor. As neither the computer system nor the display are strictly necessary, the touch-screen device may, in still other examples, take the form of a touch pad, a stand-alone touch-input system, or virtually any device configured to sense touch. In examples that include an integrated or peripheral computer system 16A, the computer system may comprise at least one processor 18A and associated computer-memory system 20A. The computer-memory system may hold instructions that cause the processor to enact any of the methods disclosed herein. In some examples, display 14R of touch-screen device 10A may be a liquid-crystal display (LCD). In other examples, the display may be a light-emitting diode (LED) display, an organic LED (OLED) display, a projection display, a scanned-beam display, or virtually any other kind of display.

Figure 2:
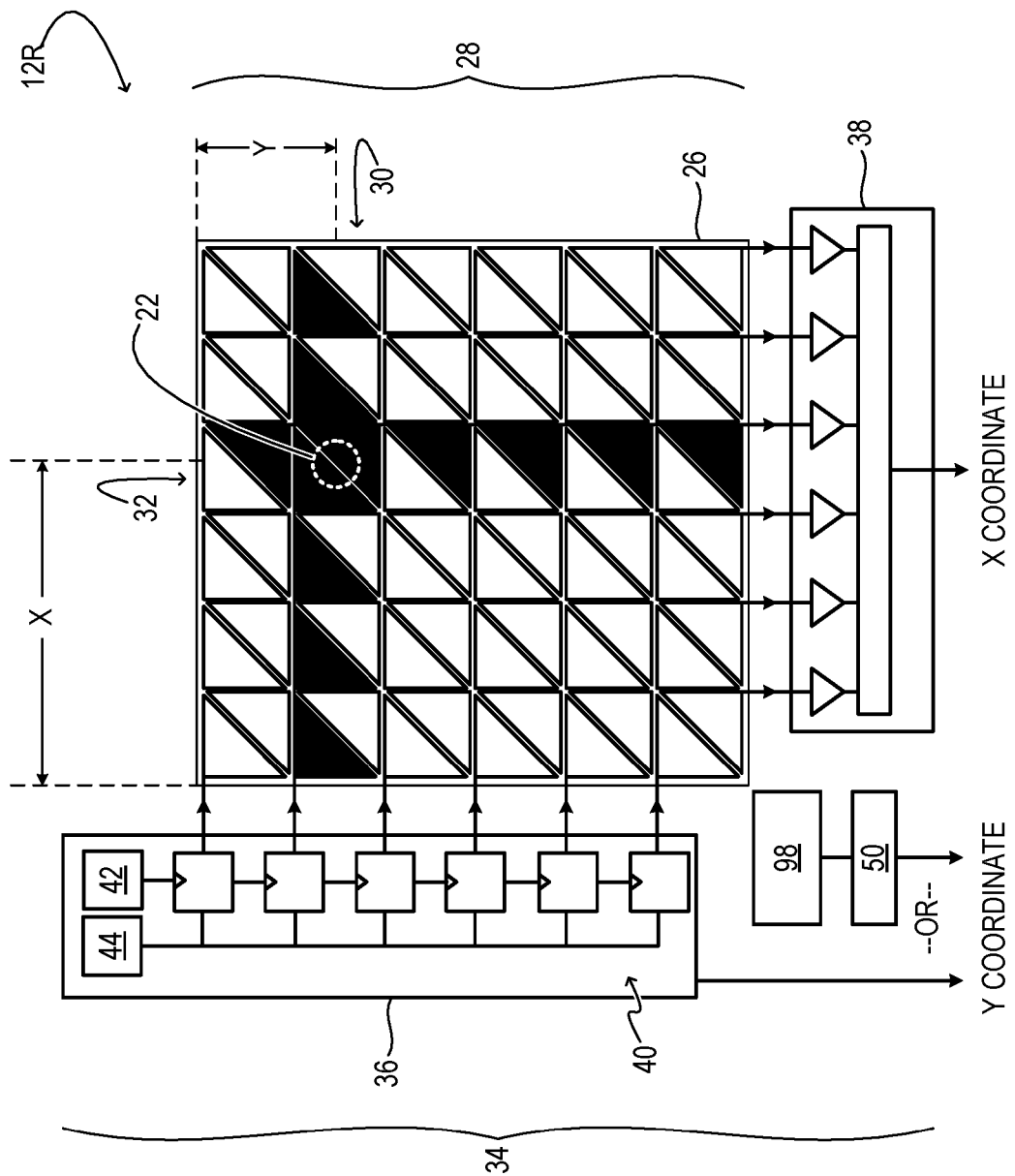
FIG. 2 shows aspects of a capacitive touch screen of an example touch screen device.

Touch screen 12R of touch-screen device 10A is configured to sense at least one touch point 22 effected by the user. An example touch point is the point of contact between the user's fingertip 24 and sensory surface 26 of the touch screen. FIG. 2 shows additional aspects of touch screen 12R in one, nonlimiting example. The touch screen of FIG. 2 is a capacitive touch screen. Arranged beneath the sensory surface of the touch screen is a position sensor 28 configured to sense the relative position of touch point 22 relative to the sensory surface. The position sensor may take the form of a transparent conductive film structure. The outer, electronically conductive layers of the film structure may be etched to form a series of row (i.e., excitation) electrodes 30 and a series of column (i.e., sensory) electrodes 32. Touch screens here contemplated may include any number N of row electrodes and any number M of column electrodes. Although it is customary to have the row electrodes aligned horizontally and the column electrodes aligned vertically, that aspect is in no way necessary, as the terms 'row' and 'column' may be exchanged everywhere in this description. The row and column electrodes of touch screen 12R are addressed by touch-screen logic 34. The touch-screen logic is configured to sense user contact on sensory surface 26, including coordinates X, Y directly behind a point of user contact of a finger or touch-screen stylus on the sensory surface. To that end, the touch-screen logic includes row-driver logic 36 and column-sense logic 38, and may include other componentry as described herein.

Column-sense logic 38 includes M column amplifiers, each coupled to a corresponding column electrode 32. Row-driver logic 36 includes a row counter 40 in the form of an N-bit shift register with outputs driving each of N row electrodes 30. The row counter is clocked by row-driver clock 42. The row counter includes a blanking input to temporarily force all output values to zero independent of the values stored. Excitation of one or many rows may be provided by filling the row counter with ones at every output to be excited, and zeroes elsewhere, and then toggling the blanking signal with the desired modulation from modulation clock 44. In the illustrated example, the output voltage may take on only two values, corresponding to the one or zero held in each bit of the row counter. In other examples, the output voltage may take on a greater range of values, to reduce the harmonic content of the output waveforms or decrease radiated emissions, for instance.

Row-driver logic 36 applies an excitation pulse to each row electrode 30 in sequence. During a period in which sensory surface 26 is untouched, none of the column amplifiers registers an above-threshold output. However, when the user places a fingertip on the sensory surface, the fingertip capacitively couples one or more row electrodes 30 intersecting the touch point 22 to one or more column electrodes 32 also intersecting the touch point. The capacitive coupling induces an above-threshold signal from the column amplifiers associated with the column electrodes beneath (i.e., adjacent to) the touch point. Column-sense logic 38 returns, as the X coordinate of the touch point, the numeric value of the column providing the greatest signal received. Touch-screen logic 34 also determines which row was being excited when the greatest signal was received, and returns the numeric value of that row as the Y coordinate of the touch point.

Column-sense logic 38 may also return a Z coordinate that varies in dependence on the strength of the signal received at coordinates X, Y. Accordingly, touch-screen logic 34 may distinguish firm touch, associated with strong signal, from light touch, associated with weaker signal, and from hover, associated with still weaker but detectable signal.

Returning briefly to FIG. 1, a touch-screen stylus 46R may be used in lieu of the user's fingertip to execute touch input on touch-screen device 10A. Accordingly, position sensor 28 of the touch-screen device may be configured to sense a relative position of the tip 48 of the touch-screen stylus relative to sensory surface 26 of the touch-screen device. Like the user's fingertip, the tip of a passive touch-screen stylus comprises a high dielectric-constant material that capacitively couples the row and column electrodes under the touch point. A passive touch-screen stylus offers better touch accuracy than the fingertip, and may reduce smudging of the sensory surface. Relative to a passive stylus, an active touch-screen stylus offers even greater touch accuracy, in addition to faster and more accurate tracking of the touch point (vide infra). Although it is typical for a passive or active touch-screen stylus to take the form of an elongate cylinder or pen, that aspect is not strictly necessary. FIG. 1 shows an alternatively shaped touch-screen input device 46S usable on a large-format touch-screen device 10S. It will be noted that touch-screen input devices of various shapes and sizes are envisaged herein and all references to a stylus equally apply to other touch-screen input devices.

Figure 3:
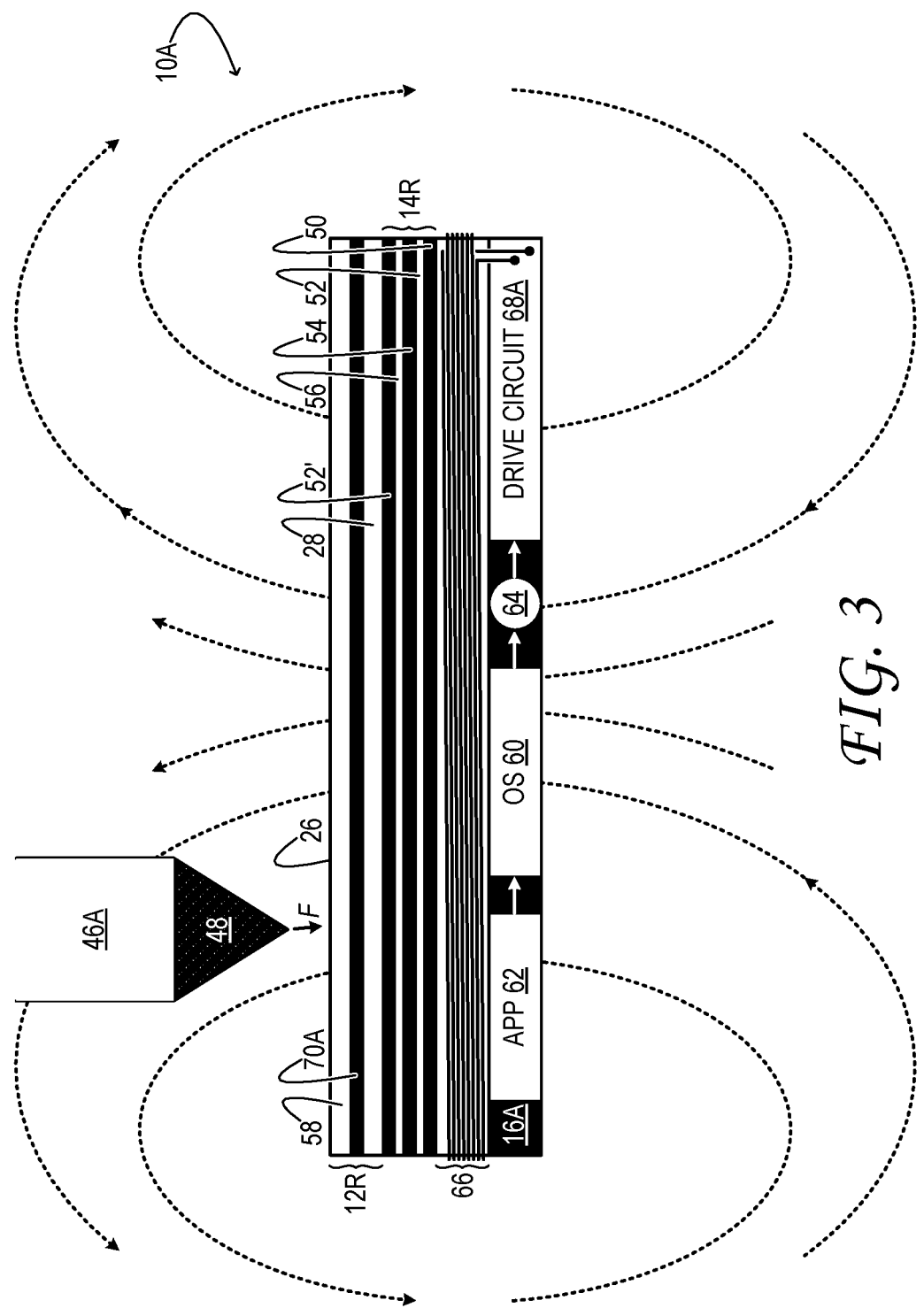
FIG. 3 shows aspects of an example touch-screen system comprising a touch-screen device and touch-screen stylus.

FIG. 3 is a schematic representation of touch-screen device 10A showing a series of stacked layers comprising touch screen 12R and display 14R. Backlighting for the display originates in light-guide plate (LGP) 50 and illuminates polarizer 52 via a series of reflectors, diffusers, and/or prismatic films. Polarizer 52 selects light of a desired polarization state for entry into thin-film transistor (TFT) glass 54. The TFT glass supports a nematic liquid-crystal layer capable of selectively rotating the plane of polarization of the light in response to external bias applied to the individual light-releasing pixel elements of the TFT glass. The light then passes through color-filter (CF) glass 56, which includes an array of CF elements positioned in registry with the pixel elements of the TFT glass, and then through a second polarizer 52', where light of the undesired polarization state is blocked. The second polarizer is bonded to position sensor 28 by a layer of optically clear adhesive (OCA), which also bonds the position sensor to cover glass 58.

FIG. 3 also shows an example touch-screen stylus 46A and additional features of touch-screen device 10A that cooperate with the touch-screen stylus to provide haptic feedback to the user of the touch-screen system.

Computer system 16A of touch-screen device 10A is configured to execute an operating system (OS) 60 and at least one application 62. During execution, the OS or application may assert a haptic force signal 64 corresponding to a desired level of attractive force between sensory surface 26 of the touch-screen device and tip 48 of touch-screen stylus 46A. In some examples, the haptic-force signal is varied by the OS or application in dependence on the coordinates X, Y, and/or Z of touch point 22—i.e., on the relative position of the tip of the touch-screen stylus relative to the sensory surface. In one, nonlimiting example, the OS or application may maintain a mapping of the sensory surface, wherein a desired value of the attractive force $F_i$ is mapped to each of a set of coordinates $(X, Y)_i$. The mapping may establish a simulated terrain of the sensory surface. The simulated terrain may include regions of facile movement of the tip, where $F_i$ is relatively small, and regions of restricted movement of the tip, where $F_i$ is relatively large. The value of each $F_i$ in the mapping may vary in any suitable increment and over any suitable range. In this example, haptic-force signal 64 may vary in dependence on the value of $F_i$ at current touch-point coordinates X, Y. In other examples, the OS or application may compute a numerical function to determine the haptic-force signal in dependence on the touch-point coordinates. In these and other examples, the haptic-force signal may vary with the Z coordinate of the touch point. For instance, the haptic-force signal may drop to zero if tip 48 is lifted off the surface to a distance beyond which hover is indicated.

In these and other examples, the value of the haptic-force signal at any, some, or all coordinates (X, Y, Z) may vary at different stages of execution of OS 60 and/or application 62. For instance, the haptic-force signal asserted as touch-screen stylus 46A traces a given path P on sensory surface 26 may be set to a low value the first time that the path is traced, and set to a higher value the second time that the path is traced. The greater friction imparted during subsequent movements along the same path may be likened to the turning of a dial or the tightening of a screw, for example.

Touch-screen device 10A includes an electromagnetic circuit 66A configured to carry an electric current and thereby form, in proportion to the electric current, a magnetic field extending outside the touch-screen device. The electromagnetic circuit may include a coil of electronically conductive windings that are wound around a suitable core. In some examples, the core may be an air core. In other examples, the core may comprise a soft ferromagnetic material configured to concentrate the magnetic field in the region of sensory surface 26. In some examples, exotic magnetic materials such as superparamagnetic materials may be used in lieu of a soft ferromagnetic material.

Drive circuit 68A is configured to receive the haptic force signal from OS 60 or application 62 and to vary the electric current in electromagnetic circuit 66A in dependence on the haptic force signal. As shown in FIG. 3, the magnetic field formed in this manner may extend to tip 48 of touch-screen stylus 46A when the tip is within range of the electromagnetic circuit.

In order to manifest a haptic force F responsive to the magnetic field from electromagnetic circuit 66A, tip 48 of touch-screen stylus 46A is magnetically attractable. In particular, the tip may include one or more of a permanent magnet and a soft ferromagnetic material. When positioned within the magnetic field of electromagnetic circuit 66A, the magnetic domains of a soft ferromagnetic material temporarily align in a direction parallel to the magnetic field gradient. This creates a magnetic force of attraction between the electromagnetic circuit and the soft ferromagnetic material, which is proportional to the absolute value of the current flowing through the electromagnetic circuit. Distinctly, the magnetic domains of a permanent magnet are aligned in parallel along an axis of the magnet, which may be arranged parallel or antiparallel to the magnetic field gradient from electromagnetic circuit 66A. In examples in which the magnetic domains are parallel to the magnetic field gradient, a magnetic force of attraction is imparted between the electromagnetic circuit and the permanent magnet. In examples in which the magnetic domains are antiparallel to the magnetic field gradient, a magnetic force of repulsion is imparted between the electromagnetic circuit and the permanent magnet. In general, the sign of the gradient of the magnetic field formed by electromagnetic circuit 66A is determined by the direction of the electric current flowing through the electromagnetic circuit. Accordingly, in examples in which tip 48 includes a permanent magnet, drive circuit 68A of touch-screen device 10A may be configured to reverse the direction of the electric current in the electromagnetic circuit in order to exert an attractive or repulsive magnetic force on the touch-screen stylus, depending on the direction of the electric current. Permanent magnets usable in the tip of the touch-screen stylus include compact neodymium magnets, for instance.

In the example shown in FIG. 3, touch-screen device 10A includes an optional force sensor 70A responsive to the contact force of tip 48 of touch-screen stylus 46A on sensory surface 26. In implementations that include the optional force sensor, drive circuit 68A may be configured to vary the electric current in electromagnetic circuit 66A further in dependence on the output of the force sensor, so as to exert closed-loop control of the contact force. In some examples, the force sensor may include a resistive touch-screen overlay integrated with capacitive position sensor 28, for reduced overall thickness of touch screen 12R.

Figure 5:
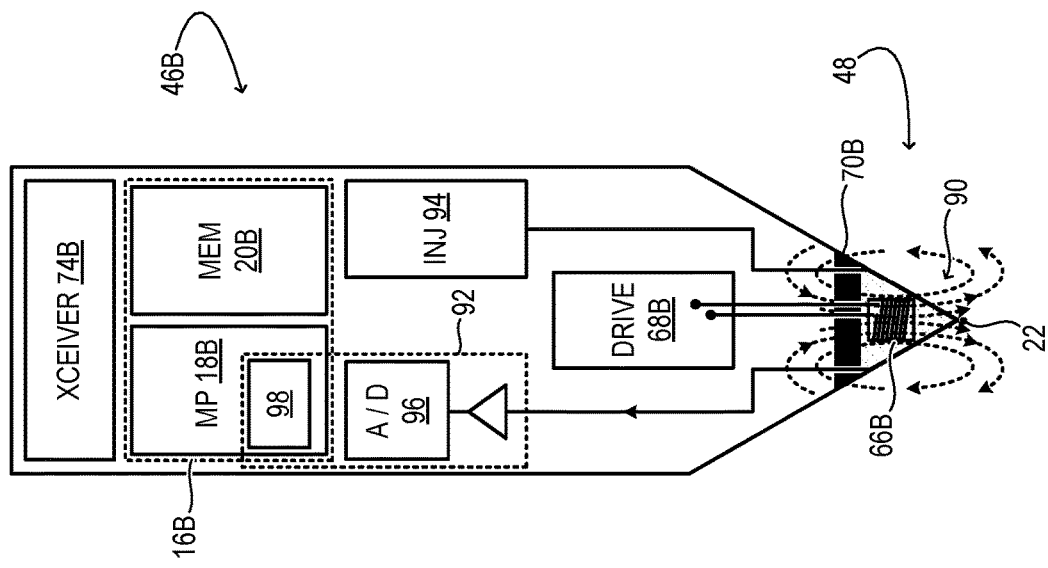
FIGS. 4 and 5 show aspects of another example touch-screen system comprising a touch-screen device and touch-screen stylus.
Figure 4:
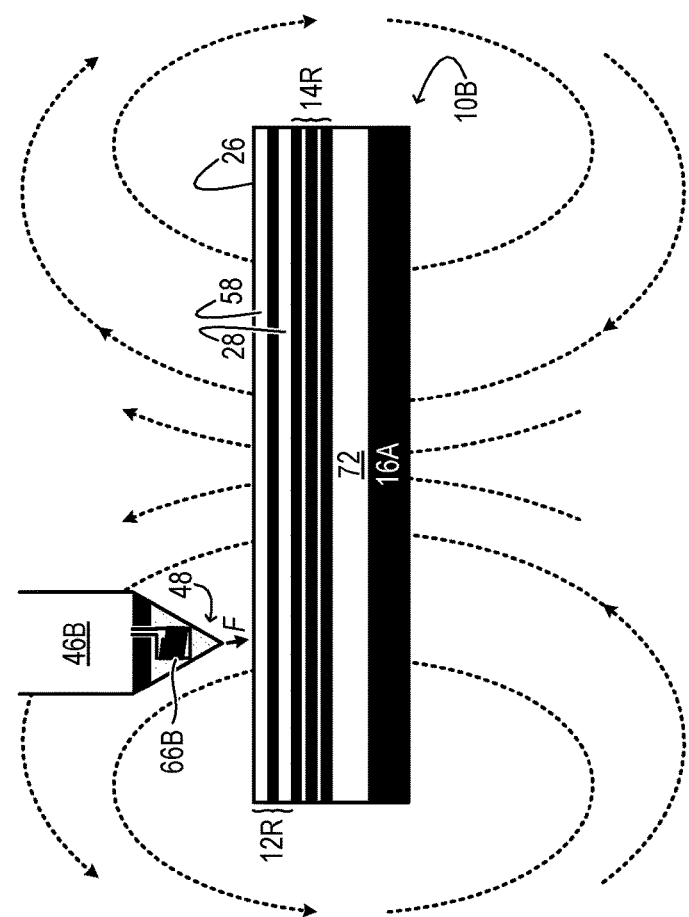

FIGS. 4 and 5 show aspects of another touch-screen system, but one in which the electromagnetic circuit is arranged in the touch-screen stylus, and the touch-screen device is magnetically attractable. Touch-screen stylus 46B of FIG. 4 includes electromagnetic circuit 66B arranged at tip 48. The electromagnetic circuit carries an electric current and forms, in proportion to the electric current, a magnetic field extending outside the touch-screen stylus. The magnetic field from electromagnetic circuit 66B may extend to region 72 of touch-screen device 10B, where a soft ferromagnetic material is distributed or where a distributed permanent magnet is arranged. The term 'distributed permanent magnet' may be applied to an array of permanent magnets having mutually aligned magnetic axes or to a dispersion of a hard ferromagnetic material magnetized to form mutually aligned magnetic domains.

Turning now to FIG. 5, drive circuit 68B of touch-screen stylus 46B is configured to receive a haptic-force signal that may originate from touch-screen device 10B, as described hereinabove in the context of touch-screen device 10A. The haptic-force signal may be received wirelessly via transceiver 74B, which may be a radio transceiver, an infrared transceiver, or an acoustic transceiver. Drive circuit 68B is configured to vary the electric current in electromagnetic circuit 66B in dependence on the haptic-force signal received. As in the previous example, the haptic force signal may be varied in dependence on the relative position of the tip of the touch-screen stylus relative to the sensory surface of the touch-screen device.

In implementations in which region 72 of touch-screen device 10B includes a distributed permanent magnet, drive circuit 68B may be configured to reverse the direction of the electric current in electromagnetic circuit 66B in order to exert an attractive or repulsive magnetic force on the touch-screen stylus depending on the direction of the electric current. In some examples, a distributed permanent magnet in region 72 may form a uniform magnetic field at sensory surface 26 of the touch-screen device. In other examples, the magnetic field may be nonuniform at the sensory surface. In some examples in which the magnetic field is nonuniform, the electric current in electromagnetic circuit 66B may be adjusted based on the measured or predicted magnetic field strength at the touch point coordinates, so as to compensate for the nonuniformity. Appropriate compensation factors may be obtained by interrogating a look-up table stored in computer-memory system 20A or a Hall-effect sensor arranged in tip 48, for example.

In some examples, touch-screen stylus 46B may include, as shown in FIG. 5, an optional force sensor 70B responsive to the contact force of tip 48 on sensory surface 26 of touch-screen device 10B. Drive circuit 68B may be configured to vary the electric current further in dependence on output of the force sensor, so as to exert closed-loop control of the contact force. In other examples, closed-loop control of the electric current may be effected based on output of a contact force sensor integrated in touch screen 12R (as in the previous example). In that configuration, transceiver 74B may be used to communicate the appropriate sensory signal between the touch screen and the touch-screen stylus.

In this and other examples, touch-screen stylus 46B may be one of a plurality of equivalently configured touch-screen styluses usable concurrently on the same touch-screen device. In scenarios in which plural touch-screen stylus are used concurrently, position sensor 28 may be configured to sense the relative position of the tip of each of the touch-screen styluses relative to sensory surface 26, and drive circuits 68 may be configured to vary independently the electric current of each of a plurality of electromagnetic circuits 66 in dependence on haptic-force signals provided independently for each touch-screen stylus.

In the example of FIGS. 4 and 5, independent haptic feedback may be provided concurrently to plural users of the same touch-screen device by virtue of the active electromagnetic circuitry arranged in each touch-screen stylus. This approach also provides an efficiency advantage, as a magnetic field is formed electromagnetically only in the regions of the touch-screen system where haptic feedback is desired. The following examples illustrate other configurations in which similar advantages may be achieved using electromagnetic circuitry arranged in the touch-screen device.

Figure 6B:
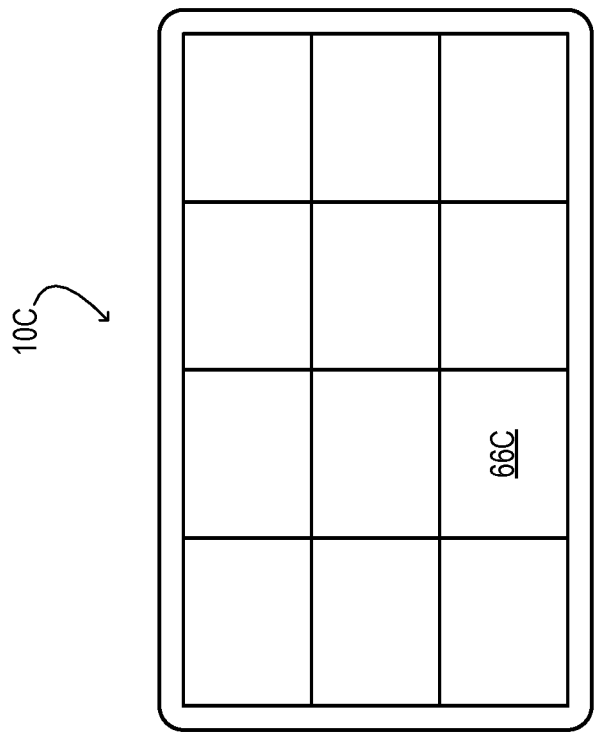
FIGS. 6A and 6B show aspects of another example touch-screen device.
Figure 6A:
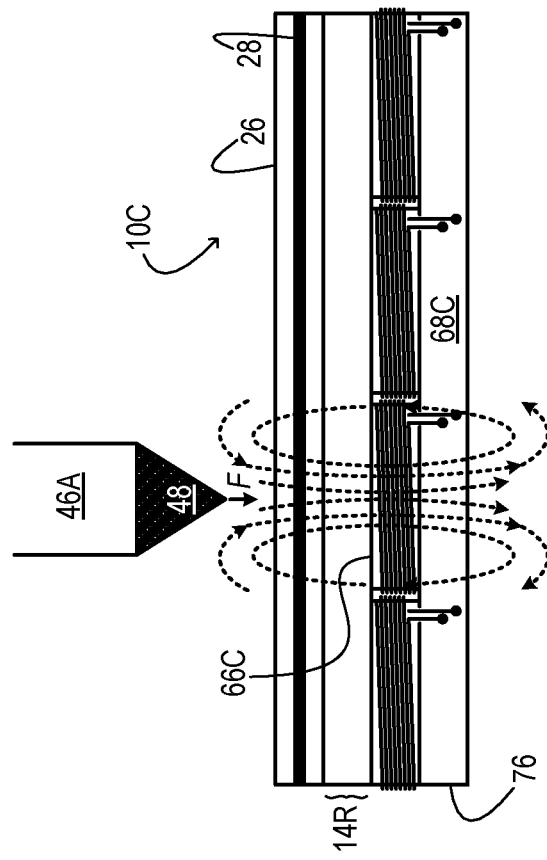

FIGS. 6A and 6B show aspects of an example touch-screen device 10C that includes a plurality of independently controlled electromagnetic regions, each having its own electromagnetic circuit 66. Electromagnetic circuit 66C of FIG. 6A is one of a plurality of electromagnetic circuits of the touch-screen device. Each electromagnetic circuit carries an electric current and forms, in proportion to that electric current, a magnetic field extending to a corresponding area outside the touch-screen device. Drive circuit 68C is configured to vary independently the electric current of each of the plurality of electromagnetic circuits in dependence on a haptic-force signal, to thereby control the magnetic field in each of the corresponding areas. An OS or application of the touch-screen device may provide an independent haptic-force signal for each of the electromagnetic regions. In this example, tip 48 of touch-screen stylus 46A may include one or more of a permanent magnet and a ferromagnetic material.

The number and/or shape of the independently controlled electromagnetic regions and corresponding electromagnetic circuits 66 of touch-screen device 10C may vary from one implementation to the next. In principle, a touch-screen device may include an electromagnetic circuit for each intersection of the row and column electrodes of the position sensor. On the other hand, as few as two electromagnetic circuits covering different regions of sensory surface 26 may reduce power consumption in the touch-screen device. In some implementations, adjacent electromagnetic circuits may overlap so as to maintain the magnetic-field intensity between adjacent independently controlled electromagnetic regions.

In the examples above, each electromagnetic circuit 66 is arranged behind the position sensor 28 and display 14R, within an enclosure 76 of the touch-screen device. In other examples, an electromagnetic circuit may be integrated into the position sensor or into a display layer of a touch-screen device. In the examples shown in FIGS. 8 and 9, for instance, electromagnetic circuits are integrated into the excitation electrodes of the position sensor.

Figure 7:
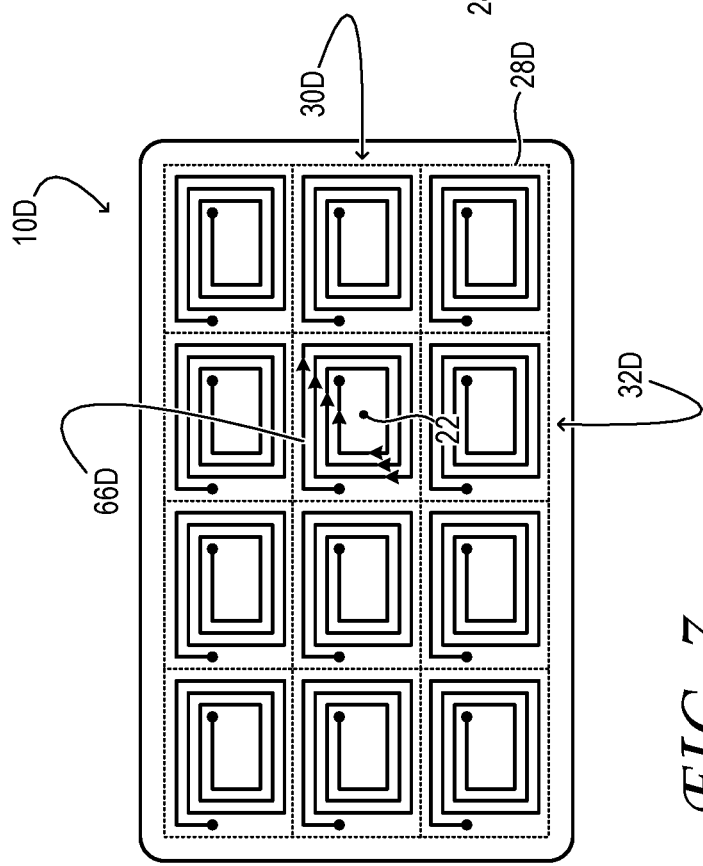

Touch-screen device 10D of FIG. 7 includes a position sensor 28D. As in the foregoing examples, the position sensor includes a series of row electrodes 30D and a series of column electrodes 32D. Each row electrode includes, at the intersection of that row electrode with each of the column electrodes, an electromagnetic circuit 66D. The electromagnetic circuit comprises plural concentric windings formed on the position sensor. In examples in which the position sensor is a thin film with etched, electronically conductive outer layers, the concentric winding pattern may be etched into one or both of the outer layers. In some examples, each electromagnetic circuit may be independently controlled by the associated drive circuit. In other examples, electromagnetic circuits of the same row may be connected in series and controlled together. As in all of the illustrated examples, the number and shape of the independently controlled electromagnetic circuits should not be construed as limiting in any sense, because touch-screen devices having more or fewer independently controlled electromagnetic circuits are equally envisaged.

Figure 8:
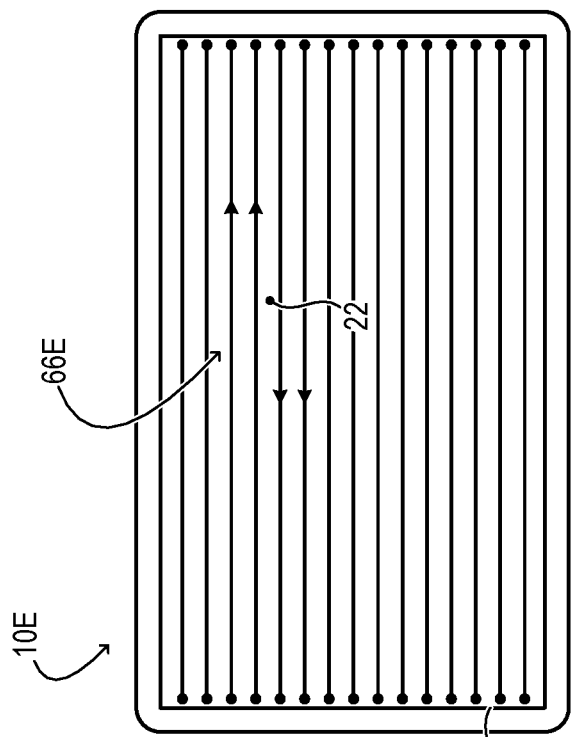
FIGS. 7 and 8 show additional aspects of other example touch-screen devices.

Touch-screen device 10E of FIG. 8 includes a position sensor 28E. As in the foregoing examples, the position sensor includes a series of row electrodes 30E. In this example, electromagnetic circuit 66E comprises adjacent, parallel row electrodes 30E of the position sensor, which carry current in opposite directions. In the illustrated scenario, row electrodes immediately above touch point 22 carry current from left to right, while row electrodes immediately below the touch point carry current from left to right. This current flow pattern forms, in the region of touch point 22, a magnetic field directed perpendicular to the array of column electrodes (i.e., out of the plane of the position sensor). Although the drawing shows current flowing through two row electrodes above the touch point and through two row electrodes below the touch point, the number of current-carrying rows may differ from one implementation to next.

Figure 9:
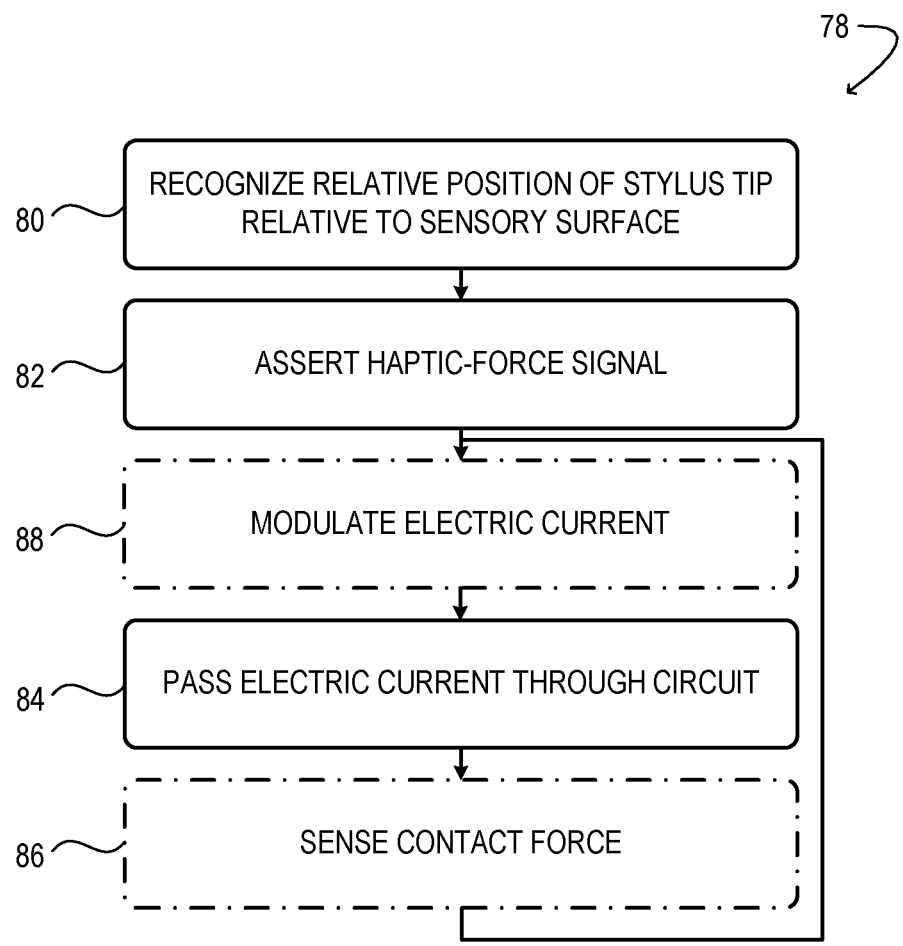
FIG. 9 illustrates an example method to provide haptic feedback to a user of a touch-screen device.

FIG. 9 illustrates an example method 78 to provide haptic feedback to a user of a touch-screen device.

At 80 of method 78, the relative position of the tip of a touch-screen stylus relative to a sensory surface of the touch-screen device is recognized. In some examples, touch-point coordinates X, Y, and/or Z may be determined by the touch screen device and/or touch-screen stylus, as described above and further described hereinafter.

At 82 an OS or application executing on the touch-screen device asserts a haptic-force signal that corresponds to a desired level of attractive force between the sensory surface of the touch-screen device and the tip of the touch-screen stylus. In some examples, the haptic-force signal may vary in dependence on the relative position of the tip of a touch-screen stylus relative to the sensory surface, as described above. In some examples, the haptic-force signal may be used to distinguish areas of facile movement of the touch-screen stylus tip over the sensory surface from areas of restricted or limited movement. The areas of facile, restricted, or limited movement may be defined so as to provide context to the user as to the virtual terrain of the sensory surface, to set a fence beyond which the touch point should not move, or to improve accessibility to vision-impaired users, for example. In these and other examples, the haptic-force signal may vary in dependence on the time or progress of execution of the OS or application asserting the haptic-force signal.

At 84 an electric current varied controllably in dependence on the haptic-force signal is passed through an electromagnetic circuit. This action exerts a magnetic force between the touch-screen device and the touch-screen stylus. The magnetic force may include a force of attraction between the touch-screen stylus and the sensory surface of the touch-screen device. Here, the force of attraction may impart a frictional force between a tip of the touch-screen stylus and the sensory surface, and the frictional force may be proportional to the force of attraction.

In some implementations, the electromagnetic circuit through which the controlled, variable electric current is passed is an electromagnetic circuit of the touch-screen device. Here, the tip of the touch-screen stylus may include a permanent magnet or ferromagnetic material. In other implementations, the electromagnetic circuit through which the controlled, variable electric current is passed is an electromagnetic circuit of the touch-screen stylus. There, the touch-screen device may include a permanent magnet or ferromagnetic material.

Optionally, at 86, the contact force between the tip of the touch-screen stylus and the sensory surface of the touch-screen device may be sensed. In implementations that include this step, the electric current passed through the electromagnetic circuit may be adjusted in in a closed-loop manner such that the contact force sensed at 86 approaches the desired setpoint value corresponding to the haptic-force signal.

Optionally, at 88, the electric current applied at 84 may be temporally modulated in scenarios in which the haptic-force signal is temporally modulated. Temporal modulation of the applied current causes the force of attraction and the frictional force to be likewise modulated. This effect may be used to provide a sensation of surface roughness as the touch-screen stylus passes over certain regions of the sensory surface.

In order to more fully describe the range of modalities by which touch-point coordinates X, Y, and/or Z may be determined at 80 of the above method, additional aspects of active touch-screen stylus 46B will now be described, again with reference to FIG. 5.

In this drawing, a probe electrode 90 is arranged at tip 48 of touch-screen stylus 46B. The probe electrode is coupled operatively to associated sensory logic 92 and injection logic 94. The sensory and injection logic are coupled operatively to, and may be embodied partially within, microprocessor 18B. Configured for digital signal processing (DSP), microprocessor 18B is coupled operatively to associated computer-memory system 20B. Sensory logic 92 includes linear analog componentry configured to maintain the probe electrode 90 at a constant voltage and convert any current into or out of the probe electrode 90 into a proportional current-sense voltage. The sensory logic includes an analog-to-digital (A/D) converter 96 that converts the current-sense voltage into digital data to facilitate subsequent processing.

Instead of capacitively coupling row and column electrodes of touch screen 12R via a dielectric, sensory logic 92 of touch-screen stylus 46B senses the arrival of an excitation pulse from row electrode 30, beneath (i.e., adjacent) touch point 22, and in response, injects charge into column electrode 32, also beneath the touch point 22. To this end, the touch-screen stylus 46B includes injection logic 94 associated with the probe electrode 90 and configured to control charge injection from the probe electrode 90 to the column electrode directly beneath (i.e., adjacent) the probe electrode. The injected charge appears, to column-sense logic 38 of the touch screen, similar to an electrostatic pulse delivered via capacitive coupling of the column electrode 32 to an energized row electrode 30 intersecting at touch point 22. In some examples, accordingly, the touch-screen logic is not limited to the touch-screen device, but extends also to microprocessor 18B and computer-memory system 20B of the touch-screen stylus.

In some examples, sensory logic 92 and injection logic 94 are active during non-overlapping time windows of each touch-sensing frame, so that charge injection and charge sensing may be enacted at the same probe electrode 90. In this implementation, touch-screen logic 34 excites the series of row electrodes 30 during the time window in which the sensory logic is active, but suspends row excitation during the time window in which the touch-screen stylus 46B may inject charge. This strategy provides an additional advantage, in that it enables touch-screen logic 34 to distinguish touch points effected by touch-screen stylus 46B from touch points effected by a fingertip or palm. If column-sense logic 38 detects charge from a column electrode 32 during the charge-injection time window of the touch-screen stylus 46B (when none of the row electrodes 30 are excited), then touch point 22 detected must be a touch point of the touch-screen stylus. However, if the column-sense logic detects charge during the charge-sensing window of the touch-screen stylus (when row electrodes 30 are being excited), then the touch point detected may be a touch point of a fingertip, hand, or passive touch-screen stylus, for example.

Active sensing followed by charge injection enables a touch point 22 of a very small area to be located precisely, and without requiring long integration times that would increase the latency of touch sensing. For example, when receiving the signal from row electrode 30, the touch-screen stylus 46B may inject a charge pulse with amplitude proportional to the received signal strength. Thus, position sensor 28 may receive the electrostatic signal from touchscreen stylus 46B and calculate the Y coordinate, which may be the row providing the greatest signal from the touch-screen stylus, or a function of the signals received at that row and adjacent rows. Nevertheless, this approach introduces various challenges. The major challenge is that the sensory logic 92 and injection logic 94 must operate simultaneously—i.e., in full-duplex mode. Various methods—for example, code division or frequency division multiple access—may be applied to cancel the strong interference at the receiving direction from the transmitting direction. The position sensor may be required to receive two signals simultaneously (one from the row electrode 30, and the other from the touch-screen stylus probe electrode 90). The system may also work by time-division, but at a cost in available integration time.

Another solution is to require touch-screen stylus 46B to assume a more active role in determining the touch point coordinates. In the illustrated example, sensory logic 92 of the touch-screen stylus 46B includes a local row counter 98, which is maintained in synchronization with row counter 40 (hereinafter, the remote row counter) of touch-screen logic 34. This feature gives the touch-screen stylus and the touch screen a shared sense of time, but without being wired together.

When probe electrode 90 touches sensory surface 26 of touch screen 12R, sensory logic 92 receives a waveform that lasts as long as the touch is maintained. The waveform acquires maximum amplitude at the moment in time when row electrode 30, directly beneath (i.e., adjacent) the probe electrode 90, has been energized. Sensory logic 92 is configured to sample the waveform at each increment of the local row counter 98 and determine when the maximum amplitude was sensed. This determination can be made once per frame, for example.

Because touch-screen stylus 46B and touch screen 12R have shared timing due to synchronized row counters, the state of local row-counter 98 at maximum sensed amplitude reports directly on the row coordinate—i.e., the Y coordinate—of touch point 22. In order to make use of this information, the Y coordinate must be communicated back to touch-screen logic 34. To this end, the touch-screen stylus includes transceiver 74B configured to wirelessly communicate the computed row coordinate to row-sense logic of the touch screen. This disclosure embraces various modes of communicating data, including the Y coordinate, from the touch-screen stylus to the touch screen.

No aspect of the foregoing drawings or description should be interpreted in a limiting sense, because numerous variations, extensions, and omissions are also envisaged. For instance, although touch screen 12R of the above description is a capacitive touch screen, this disclosure is equally consonant with touch screens having resistive and/or optical touch-sensing componentry. In examples in which a given layer of the touch-screen stack is used for combined purposes of display, touch-sensing, and/or magnetic-field formation, these actions need not be executed concurrently, but may be executed in a time-multiplexed manner. For instance, a user-interface frame of the touch-screen device may be divided into display, touch-sensing, and magnetic-field subframes, with appropriate signals sent during each subframe to the combination layer.

In some implementations, the methods and processes described herein may be tied to a computer system of one or more computer system devices. Such methods and processes may be implemented as an operating system (OS), an application program or service, an application programming interface (API), a library, and/or other computer system-program product.

FIGS. 1 and 5 show schematic representations of computer systems 16 configured to provide any to all of the computer system functionality described herein. Each computer system 16 includes a logic system 18 and a memory system 20. Computer system 16 may optionally include a display system 14, an input system 12, a communication system 74, and/or other systems not shown in the drawings.

Logic system 18 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing.

Memory system 20 includes at least one physical device configured to temporarily and/or permanently hold computer system information, such as data and instructions executable by logic system 18. When the memory system includes two or more devices, the devices may be collocated or remotely located. Memory system 20 may include at least one volatile, nonvolatile, dynamic, static, read/write, read-only, random-access, sequential-access, location-addressable, file-addressable, and/or content-addressable computer system-memory system device. Memory system 20 may include at least one removable and/or built-in computer system-memory system device. When the logic system executes instructions, the state of memory system 20 may be transformed—e.g., to hold different data.

Aspects of logic system 18 and memory system 20 may be integrated together into one or more hardware-logic components. Any such hardware-logic component may include at least one program- or application-specific integrated electromagnetic circuit (PASIC/ASIC), program- or application-specific standard product (PSSP/ASSP), system-on-a-chip (SOC), or complex programmable logic device (CPLD), for example.

Logic system 18 and memory system 20 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computer system device, or a machine or engine may include two or more subcomponents instantiated by two or more different computer system devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer system-memory system devices.

When included, display system 14 may be used to present a visual representation of data held by memory system 20. The visual representation may take the form of a graphical user interface (GUI) in some examples. Display system 14 may include one or more display devices utilizing virtually any type of technology. In some implementations, display system may include one or more virtual-, augmented-, or mixed reality displays.

When included, input system 12 may comprise or interface with one or more input devices. An input device may include a sensor device or a user input device. Examples of user input devices include a keyboard, mouse, or touch screen.

When included, communication system 74 may be configured to communicatively couple computer system 16 with one or more other computer systems. Communication system 74 may include wired and/or wireless communication devices compatible with one or more different communication protocols. The communication system may be configured for communication via personal-, local- and/or wide-area networks.

To further summarize, one aspect of this disclosure is directed to a touch-screen device comprising a position sensor, an electromagnetic circuit, and a drive circuit. The position sensor is configured to sense a relative position of a magnetically attractable tip of a touch-screen stylus relative to a sensory surface of the touch-screen device. The electromagnetic circuit carries an electric current and forms, in proportion to the electric current, a magnetic force to attract the magnetically attractable tip to the sensory surface. The drive circuit is configured to receive a haptic-force signal and to vary the magnetic force by varying the electric current in dependence on the haptic force signal, wherein the haptic-force signal is varied in dependence on the relative position.

In some implementations, the electromagnetic circuit is one of a plurality of electromagnetic circuits of the touch-screen device, each electromagnetic circuit carrying an electric current and forming, in proportion to that electric current, a magnetic field extending to a corresponding area outside the touch-screen device. Here, the drive circuit is configured to vary independently the electric current of each of the plurality of electromagnetic circuits in dependence on the haptic-force signal, to thereby control the magnetic field in each of the corresponding areas. In some implementations, the touch-screen stylus is one of a plurality of touch-screen styluses usable concurrently on the touch-screen device. Here, the position sensor is configured to sense a relative position of a tip of each of the touch-screen styluses relative to the sensory surface, and the drive circuit is configured to vary independently the electric current of each of the plurality of electromagnetic circuits in dependence on a haptic-force signal provided independently for each touch-screen stylus. In some implementations, the electromagnetic circuit is integrated into the position sensor or into a display layer of the touch-screen device. In some implementations, the position sensor includes a capacitance-sensing electrode array, and the electromagnetic circuit is integrated into an excitation electrode of the electrode array. In some implementations, the electromagnetic circuit comprises plural concentric windings formed at an intersection of excitation and sensory electrodes of the electrode array. In some implementations, the electromagnetic circuit comprises parallel excitation electrodes of the electrode array, which carry current in opposite directions. In some implementations, the magnetically attractable tip includes a permanent magnet, and the drive circuit is configured to reverse a direction of the electric current to exert a repulsive magnetic force on the touch-screen stylus. In some implementations, the touch-screen device further comprises a force sensor responsive to a contact force of the tip of the touch-screen stylus on the sensory surface, and the drive circuit is configured to vary the electric current further in dependence on output of the force sensor. In some implementations, the force sensor includes a resistive touch-screen overlay integrated with a capacitive position sensor.

Another aspect of this disclosure is directed to a touch-screen stylus for a magnetically attractable touch-screen device. The touch-screen stylus comprises an electromagnetic circuit and a drive circuit. Arranged at a tip of the touch-screen stylus, the electromagnetic circuit carries an electric current and forms, in proportion to the electric current, a magnetic force to attract the touch-screen device to the tip. The drive circuit is configured to receive a haptic-force signal and to vary the magnetic force by varying the electric current in dependence on the haptic-force signal, wherein the haptic force signal is varied in dependence on a relative position of the tip relative to a sensory surface of a touch-screen device.

In some implementations, the touch-screen stylus further comprises a force sensor responsive to a contact force of the tip of the touch-screen stylus on the sensory surface of the touch-screen device, and the drive circuit is configured to vary the electric current further in dependence on output of the force sensor. In some implementations, the magnetically attractable touch-screen device includes a permanent magnet, and the drive circuit is configured to reverse a direction of the electric current to exert a repulsive magnetic force on the touch-screen device. In some implementations, the permanent magnet forms a uniform magnetic field at the sensory surface of the touch-screen device.

Another aspect of this disclosure is directed to a method to provide haptic feedback to a user of a touch-screen device, the method comprising: recognizing a relative position of a tip of a touch-screen stylus relative to a sensory surface of the touch-screen device; asserting a haptic-force signal that varies in dependence on the relative position; and passing a controlled, variable electric current through an electromagnetic circuit to exert a magnetic force between the touch-screen device and the touch-screen stylus, wherein the electric current is varied in dependence on the haptic-force signal.

In some implementations, the magnetic force includes a force of attraction between the touch-screen stylus and the sensory surface of the touch-screen device. Here, the force of attraction imparts a frictional force between a tip of the touch-screen stylus and the sensory surface, and the frictional force is proportional to the force of attraction. In some implementations, the method further comprises temporally modulating the electric current such that the force of attraction and the frictional force are likewise modulated. In some implementations, the electromagnetic circuit through which the controlled, variable electric current is passed is an electromagnetic circuit of the touch-screen device, and the tip of the touch-screen stylus includes a permanent magnet or ferromagnetic material. In some implementations, the electromagnetic circuit through which the controlled, variable electric current is passed is an electromagnetic circuit of the touch-screen stylus, and the touch-screen device includes a permanent magnet or ferromagnetic material. In some implementations, the method further comprises sensing a contact force between the tip of the touch-screen stylus and the sensory surface of the touch-screen device, wherein passing the controlled, variable electric current through the electromagnetic circuit includes adjusting the current in a closed-loop manner so that the contact force approaches a controlled, variable setpoint value It will be understood that the configurations and/or approaches described herein are exemplary in nature, and that these specific examples or examples are not to be construed in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various configurations, properties, functions, processes, acts, and other features disclosed herein, as well as any and all equivalents thereof.

The invention claimed is:

1. A touch-screen device comprising:
a position sensor configured to sense a relative position of a magnetically attractable tip of a touch-screen stylus relative to a sensory surface of the touch-screen device, the position sensor including a capacitance-sensing electrode array with a plurality of excitation electrodes;
an electromagnetic circuit carrying an electric current and forming, in proportion to the electric current, a magnetic force to attract the magnetically attractable tip to the sensory surface, the electromagnetic circuit including one or more of the plurality of excitation electrodes of the position sensor; and
a drive circuit configured to receive a haptic-force signal and to vary the magnetic force by varying the electric current in dependence on the haptic force signal, wherein the haptic-force signal is varied in dependence on the relative position.

2. The touch-screen device of claim 1 wherein the electromagnetic circuit is one of a plurality of electromagnetic circuits of the touch-screen device, each electromagnetic circuit carrying an electric current and forming, in proportion to that electric current, a magnetic field extending to a corresponding area outside the touch-screen device, and wherein the drive circuit is configured to vary independently the electric current of each of the plurality of electromagnetic circuits in dependence on the haptic-force signal, to thereby control the magnetic field in each of the corresponding areas.

3. The touch-screen device of claim 2 wherein the touch-screen stylus is one of a plurality of touch-screen styluses usable concurrently on the touch-screen device, wherein the position sensor is configured to sense a relative position of a tip of each of the touch-screen styluses relative to the sensory surface, and wherein the drive circuit is configured to vary independently the electric current of each of the plurality of electromagnetic circuits in dependence on a haptic-force signal provided independently for each touch-screen stylus.

4. The touch-screen device of claim 1 wherein the electromagnetic circuit is integrated into the position sensor or into a display layer of the touch-screen device.

5. The touch-screen device of claim 1 wherein the electromagnetic circuit comprises plural concentric windings formed at an intersection of excitation and sensory electrodes of the electrode array.

6. The touch-screen device of claim 1 wherein the electromagnetic circuit comprises parallel excitation electrodes of the electrode array, which carry current in opposite directions.

7. The touch-screen device of claim 1 wherein the magnetically attractable tip includes a permanent magnet, and wherein the drive circuit is configured to reverse a direction of the electric current to exert a repulsive magnetic force on the touch-screen stylus.

8. The touch-screen device of claim 1 further comprising a force sensor responsive to a contact force of the tip of the touch-screen stylus on the sensory surface, and wherein the drive circuit is configured to vary the electric current further in dependence on output of the force sensor.

9. The touch-screen device of claim 8 wherein the force sensor includes a resistive touch-screen overlay integrated with a capacitive position sensor.

10. A touch-screen stylus for a magnetically attractable touch-screen device, the touch-screen stylus comprising:
an electromagnetic circuit arranged at a tip of the touch-screen stylus, the electromagnetic circuit carrying an electric current and forming, in proportion to the electric current, a magnetic force to attract the touch-screen device to the tip;
a drive circuit configured to receive a haptic-force signal and to vary the magnetic force by varying the electric current in dependence on the haptic-force signal, wherein the haptic force signal is varied in dependence on a relative position of the tip relative to a sensory surface of a touch-screen device; and
a force sensor responsive to a contact force of the tip of the touch-screen stylus on the sensory surface of the touch-screen device, wherein the drive circuit is configured to vary the electric current further in dependence on output of the force sensor.

11. The touch-screen stylus of claim 10 wherein the magnetically attractable touch-screen device includes a permanent magnet, and wherein the drive circuit is configured to reverse a direction of the electric current to exert a repulsive magnetic force on the touch-screen device.

12. The touch-screen stylus of claim 11 wherein the permanent magnet forms a uniform magnetic field at the sensory surface of the touch-screen device.

13. The touch-screen stylus of claim 10 wherein the touch-screen stylus is one of a plurality of touch-screen styluses concurrently operable on the sensory surface of the touch-screen device.

14. A method to provide haptic feedback to a user of a touch-screen device, the method comprising:
recognizing a relative position of a tip of a touch-screen stylus relative to a sensory surface of the touch-screen device in a position sensor of the touch-screen device, the position sensor including a capacitance-sensing electrode array with a plurality of excitation electrodes;
asserting a haptic-force signal that varies in dependence on the relative position; and
passing a controlled, variable electric current through an electromagnetic circuit of the touch-screen device to exert a magnetic force between the touch-screen device and the touch-screen stylus, wherein the electric current is varied in dependence on the haptic-force signal, and wherein the electromagnetic circuit includes one or more of the plurality of excitation electrodes of the position sensor.

15. The method of claim 14 wherein the magnetic force includes a force of attraction between the touch-screen stylus and the sensory surface of the touch-screen device, wherein the force of attraction imparts a frictional force between a tip of the touch-screen stylus and the sensory surface, and wherein the frictional force is proportional to the force of attraction.

16. The method of claim 15 further comprising temporally modulating the electric current such that the force of attraction and the frictional force are likewise modulated.

17. The method of claim 14 wherein the electromagnetic circuit through which the controlled, variable electric current is passed is an electromagnetic circuit of the touch-screen device, and wherein the tip of the touch-screen stylus includes a permanent magnet or ferromagnetic material.

18. The method of claim 14 further comprising sensing a contact force between the tip of the touch-screen stylus and the sensory surface of the touch-screen device, wherein passing the controlled, variable electric current through the electromagnetic circuit includes adjusting the current in a closed-loop manner so that the contact force approaches a controlled, variable setpoint value.

* * * * *